Sept. 8, 1959     W. T. BRAHMSTEDT     2,903,295
COLLISION PROOF AUTOMOBILE BODY
Filed April 9, 1956
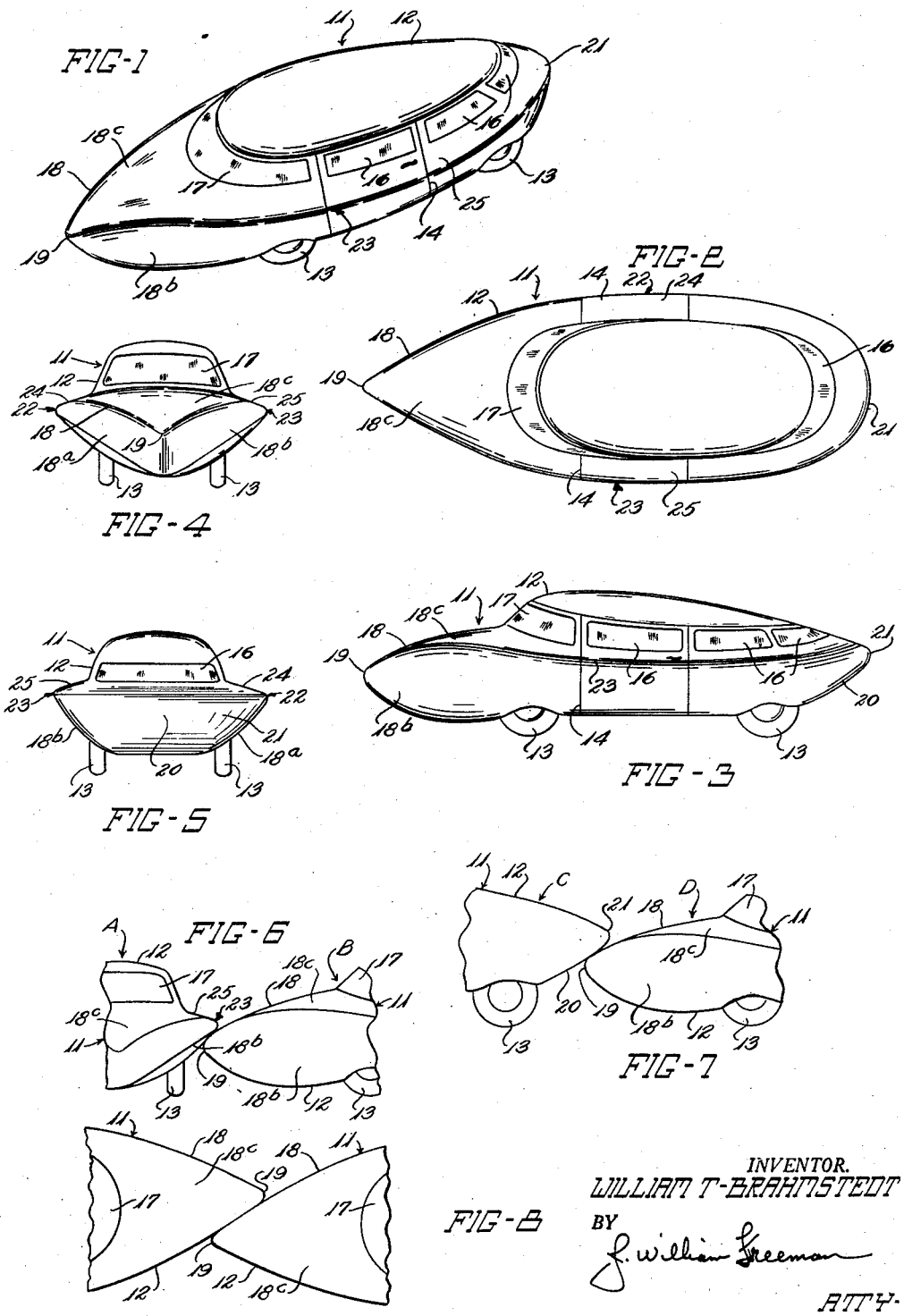
INVENTOR.
WILLIAM T. BRAHMSTEDT
BY
J. William Freeman
ATTY.

United States Patent Office 2,903,295
Patented Sept. 8, 1959

2,903,295

COLLISION PROOF AUTOMOBILE BODY

William T. Brahmstedt, Barrington, R.I.

Application April 9, 1956, Serial No. 576,981

2 Claims. (Cl. 296—1)

This invention relates to motor vehicles, and more particularly has reference to a motor vehicle that includes an outer physical contour adapted to reduce the shock of impact from collision with other vehicles of like shape.

The tremendous increase in vehicular traffic on highways in recent years has resulted in an intense search by automobile engineers and others for designs and devices to increase the safety of those traveling as passengers in buses, automobiles and other vehicles. It has long been known that the major danger in vehicular traffic lies in the collision between vehicles, either head-on, by side-swiping, or by one vehicle running into the rear of another.

In an attempt to minimize the dangers of such collision the known prior art has directed its efforts towards the provision of cushioning or other safety devices provided interiorly of the car, such as padded dashboards, safety belts, and collapsible steering wheels.

Until the present invention, the outer configuration of motor vehicles has not been adapted to dissipate, absorb, or deflect forces occurring upon collision between vehicles of like kind. This has to the present time, been due to the requirements of style and space in automobile design, which requirements have resulted in the creation of bodies of irregular or boxy shape, little adapted in design to reduce shock upon collision with another body of similar shape.

The present invention overcomes the disadvantages and dangers of the prior art by providing a vehicle having an external configuration specifically adapted in design to dissipate, absorb and/or deflect the energy of impact that arises upon collision of vehicles. This improved result is accomplished by providing a vehicle with a body design having the outermost peripheral portions at each end and at the sides in different planes of elevation; and by further having the car body formed of oval shape in plan.

It is accordingly a principal object of this invention to provide an automobile having an improved body design that is capable of deflecting and absorbing the force of impact that occurs upon collision between vehicles of like configuration.

It is a further object of this invention to provide a collision-proof vehicle having the front, rear, and side portions terminating at outer edges that are located in different planes of elevation.

It is a still further object of this invention to provide a vehicle having the rear end portion thereof designed to slide away from the path of travel of the front end of a vehicle of like design upon collision therewith.

It is a still further object of this invention to provide an automobile having an improved front end body design, whereby the force of impact will be minimized in head-on collisions between vehicles of like configuration.

These and other objects of the invention will become more apparent upon a reading of the following brief specification, considered and interpreted in the light of the accompanying drawings.

Of the drawings:

Figure 1 is a perspective view of an automobile body employing the teachings of this invention.

Figure 2 is a plan view of the vehicle of the invention.

Figure 3 is a side elevation of the vehicle of the invention.

Figures 4 and 5 are front and rear elevations, respectively, of the vehicle of the invention.

Figure 6 is a fragmentary front elevation of two vehicles constructed according to the invention at the moment of front-to-side collision.

Figure 7 is a fragmentary side elevation of the front of one vehicle of the invention colliding with the rear of a second vehicle of the invention.

Figure 8 is a fragmentary plan view illustrating the deflection occurring upon head-on collision of like vehicles.

Referring now to the drawings, and in particular to Figure 1 thereof, a motor vehicle, generally indicated by the numeral 11 is shown defined by a streamlined body 12 of generally teardrop configuration in plan that is mounted by conventional suspension means (not shown) on wheels 13, so as to permit propulsion by a conventional motor that is mounted interiorly of the body 12. Accessibility to the interior of the body 12 is provided by doors 14, 14, while light and visibility for occupants is facilitated by windows 16, 16 and windshield 17.

From the standpoint of description of the improved auto body 12, it will be first noted that the same has an encircling peripheral edge surface that defines, at any point along the length of the body, the maximum transverse width thereof, with the encircling peripheral edge surface being defined by opposed side segments 22 and 23 that respectively interconnect the front and rear portions of the automobile body.

Considering first the forward portion 18 of the body, it will be seen that the same is made up of opposite flared under-surfaces 18a and 18b (see Figure 4) that merge with the side edges 22 and 23 to define the lowermost under-surface of the automobile body with these surfaces creating a prow-like under-surface for the forward-most portion of the body. Also, the front portion 18 includes a hood surface 18c, that tapers downwardly, as best shown in Figure 3, towards the front of the automobile so as to terminate in the extreme forward portion 19; with the hood portion 18c being merged with the forward portions of the encircling edges 22 and 23, as is clearly shown in Figure 2 of the drawings. For purposes to be described, this point 19 is preferably the lowest point of elevation of edges 22 and 23 above the ground.

Referring next to Figures 3 and 5 for a description of the rear-most portion of the automobile body 12, it will be seen that the same is defined by a rear under-surface member, indicated generally by the numeral 20, with this under-surface 20 tapering upwardly from the rear wheel region of the body, to the rearmost portion of edges 22 and 23, as indicated by the numeral 21 in Figures 2, 3 and 7 of the drawings. In this regard, and as best shown in Figure 7, the angle of inclination of surface 20 to the ground approximates the angle of inclination of the hood surface 18c to the ground, and in this manner, when a rear-end collision of the type illustrated in Figure 7 is encountered, the nose, or forward-most portion 19 will slide under the rearmost portion 21 and ride along the surface 20 to cause a lifting of the rear end, rather than a direct impact. Similarly, and as best shown in Figures 4, 5 and 6, the overall under-surface of the body includes opposed side under-surfaces that exist in the region of doors 14, 14, with these side under-surfaces tapering downwardly towards the center of the car, and with these surfaces being inclined to horizontal in approximately the same degree as the hood 18c so that upon the occurrence of a front-to-side collision of the type shown in Figure 6, the surface 18c will slide against the under-surface provided in the region of the doors 14, 14. It is to be understood in this regard that the under-surfaces in this region merge with the rear under-surface 20 and front under-surface 18a and 18b to define a continuous under-surface, the upper portion of which is defined by the encircling edges 22 and 23.

In addition to the aforementioned parts, the body 12 also includes roof sections 24 and 25 that are disposed above the plane of the edge surfaces 22 and 23, and that converge to form a continuous roof surface that extends rearwardly from the hood surface 18c, as is best shown in Figures 2 and 3 of the drawings.

In use or operation of automobile bodies of the type above described, the general intention of the invention is that any direct impact will be avoided, and accordingly, two representative examples of collisions are shown in Figures 6 and 7 of the drawings. It is to be understood that other representative collisions are to be included in the scope of this invention. For example, in the head-on collision of two automobiles of like configuration as shown in Figure 8, it is apparent that the arcuate configuration of the rounded nose portion 19 causes a swerving or veering off of the two automobiles, when the same meet head-on; with the result that no complete impact of unyielding forces can occur as a result of this nose configuration.

In Figure 6 of the drawings, there is illustrated the effects of a collision between an automobile A and an automobile B, with the nose portion of the automobile B running into the side of the automobile A. It will be seen in this collision, that the nose portion 18 of the automobile B has engaged the undersurface 18a of the automobile A; and in this manner, the hood surface 18c will slide along the undersurface 18a of automobile A, with the result that direct impact will be avoided.

In Figure 7, there is shown an automobile C, the rear portion of which is being struck by the nose portion of an automobile D. In this form of the invention it will be noted that once again the hood portion 18c of the car D is sliding along the undersurface 20 of the car C, with the result that the car C will have the rear portion thereof lifted upward so as to avoid a direct collision between unyielding forces.

It will be seen from the foregoing that there has been provided a new and novel type of automobile that is designed to absorb, deflect and dissipate forces occurring upon collision between automobiles of like configuration.

It has been shown how the provision of an automobile that has the front portion in a lower plane than any other peripheral portion thereof, precludes the possibility of direct impact between automobiles of like configuration. For example, it has been shown that if such an automobile runs into a similar type of automobile that the nose portion thereof will be received on the undersurface of the second automobile which is being struck, with the result that the force of impact will be dissipated and/or deflected so that serious injury will be avoided in many cases. Similarly, in the event of a head-on collision between like vehicles the rounded nose portions terminating in arcuate sides 22, 23 preclude the possibility of direct impact between these nose sections. This rounded nose 19 terminating in a point, in effect has the added feature that this construction minimizes the danger occurring upon the front end of the vehicle colliding with foreign objects such as telephone poles, trees, etc. In such collisions it is believed manifest that the front of the car as defined by nose portion 19 will veer off so as to avoid direct impact.

While a complete detailed specification has been recited above in accordance with the provisions of the patent statutes, it is to be understood that the invention is not so limited to the specific configurations, compositions and forms set forth above. Thus, for example, the body 12 of the novel vehicle may be constructed of many high strength and impact-resistant materials, such as stamp sheet metal, molded plastic, aluminum, fiberglass-reinforced polyester resin, laminated wood or bonded fibrous materials. Similarly, suitable bracing and reinforcement within the body shell itself may be incorporated as desired, to reinforce the surfaces most likely to receive impact, such as the nose, rear or side portions.

It accordingly follows that modifications of the invention may be resorted to without departing from the spirit hereof or the scope of the appended claims.

What is claimed is:

1. A collision proof main body section for a motor vehicle, comprising: an encircling peripheral edge surface that defines the maximum transverse width of said body at any point along its length; front, side and rear undersurfaces, each joined to and tapering downwardly and inwardly from said edge surface and defining a substantially continuous undersurface for said body section; a roof enclosure joined to said edge surface; a hood surface joined to said edge surface and said roof enclosure; said hood surface and said side and rear undersurfaces being substantially similarly inclined at an acute angle with respect to each other and a horizontal ground line; said front undersurface having a V-shaped prowlike configuration and including opposed surfaces that are similarly inclined at an acute angle with respect to each other and said hood surface; said encircling peripheral edge surface including an endmost point that is at a lower elevation above ground than any other point in said encircling peripheral edge surface.

2. The device of claim 1 further characterized by the fact that said body is of teardrop configuration in plan so as to have a pointed nose portion.

References Cited in the file of this patent

UNITED STATES PATENTS

| D. 171,628 | Weddell | Mar. 2, 1954 |
| 2,232,275 | Ronning | Feb. 18, 1941 |

FOREIGN PATENTS

| 809,482 | France | Dec. 12, 1936 |
| 866,427 | France | May 12, 1941 |
| 1,112,848 | France | Nov. 23, 1955 |
| 912,663 | Germany | May 31, 1954 |
| 407,938 | Italy | Dec. 14, 1944 |